United States Patent
Gaughan et al.

(10) Patent No.: US 11,563,806 B1
(45) Date of Patent: Jan. 24, 2023

(54) CONTENT DISTRIBUTION NETWORK SYSTEM AND METHOD

(71) Applicant: R-Stor Inc., Saratoga, CA (US)

(72) Inventors: Anthony P. Gaughan, San Francisco, CA (US); Giovanni Coglitore, Saratoga, CA (US)

(73) Assignee: R-STOR, INC., Saratoga, CA (US)

( * ) Notice: Subject to any disclaimer, the term of this patent is extended or adjusted under 35 U.S.C. 154(b) by 0 days.

(21) Appl. No.: 16/877,212

(22) Filed: May 18, 2020

Related U.S. Application Data

(60) Provisional application No. 62/849,686, filed on May 17, 2019.

(51) Int. Cl.
| | |
|---|---|
| G06F 15/16 | (2006.01) |
| H04L 67/1097 | (2022.01) |
| H04L 67/06 | (2022.01) |
| H04L 67/1021 | (2022.01) |
| H04L 67/52 | (2022.01) |

(52) U.S. Cl.
CPC .......... H04L 67/1097 (2013.01); H04L 67/06 (2013.01); H04L 67/1021 (2013.01); H04L 67/52 (2022.05)

(58) Field of Classification Search
CPC . H04L 67/1097; H04L 67/06; H04L 67/1021; H04L 67/18
See application file for complete search history.

(56) References Cited

U.S. PATENT DOCUMENTS

| | | | | |
|---|---|---|---|---|
| 9,792,298 | B1* | 10/2017 | Taylor | G06F 16/1844 |
| 10,635,604 | B2* | 4/2020 | Jiang | G06F 12/0831 |
| 10,754,813 | B1* | 8/2020 | Sorenson, III | G06F 15/16 |
| 2002/0009092 | A1* | 1/2002 | Seaman | G06Q 30/0601 |
| | | | | 370/406 |
| 2010/0332454 | A1* | 12/2010 | Prahlad | H04L 67/2852 |
| | | | | 707/654 |
| 2014/0006465 | A1* | 1/2014 | Davis | G06F 16/183 |
| | | | | 707/827 |
| 2016/0110266 | A1* | 4/2016 | Nara | G06F 11/1456 |
| | | | | 707/680 |
| 2020/0034050 | A1* | 1/2020 | Brasfield | G06F 3/0619 |

* cited by examiner

Primary Examiner — Farzana B Huq
(74) Attorney, Agent, or Firm — Potomac Law Group, PLLC

(57) ABSTRACT

Systems and apparatus for providing content distribution network (or CDN) egress and/or ingress functionality and methods for making and using the same. In various embodiments, the system can comprise not only a traditional CDN but also a reverse CDN, wherein edge Points of Presence (or PoPs) can be used as ingest points. The system advantageously can be applied to given emerging workloads, such as autonomous applications, artificial intelligence (AI) applications and Internet of Things (IoT) applications, among other things.

16 Claims, 5 Drawing Sheets

300

- 310 Enabling a local content storage system to receive user data content
- 320 Processing the received user data content at the local content storage system
- 330 Transmitting the received user data content to an intermediate content storage system for storage
- 340 Processing the received user data content at the intermediate content storage system
- 350 Transmitting the received user data content to a central content storage system for storage

Fig. 4

CONTENT DISTRIBUTION NETWORK SYSTEM AND METHOD

CROSS-REFERENCE TO RELATED APPLICATIONS

This application claims the benefit of, and priority to, U.S. Provisional Application Ser. No. 62/849,686, filed May 17, 2019, the disclosure of which is hereby incorporated herein by reference in its entirety and for all purposes.

FIELD

The present disclosure relates generally to digital data processing and more particularly, but not exclusively, to systems and methods for providing content distribution (or delivery) network egress and/or ingress functionality.

BACKGROUND

A content distribution (or delivery) network (or CDN) is a geographically-distributed network of proxy servers and data centers. By providing high network availability and high network performance by distributing the servers geographically, CDNs serve a large portion of data content, including media streaming, web objects, applications, and social media. CDNs suffer from several disadvantages. Traditional CDN solutions, for example, provide broad coverage to metro areas but serve rural space poorly. Approximately half of consumers in the United States live outside of metro areas.

In view of the foregoing, a need exists for an improved system and method for providing content distribution (or delivery) network egress and/or ingress functionality in an effort to overcome the aforementioned obstacles, challenges and deficiencies of conventional data processing systems.

BRIEF DESCRIPTION OF THE DRAWINGS

FIG. 4 is a top-level flow chart illustrating an exemplary embodiment of a data ingress method for the content distribution network system of FIG. 1.

Figure 1:
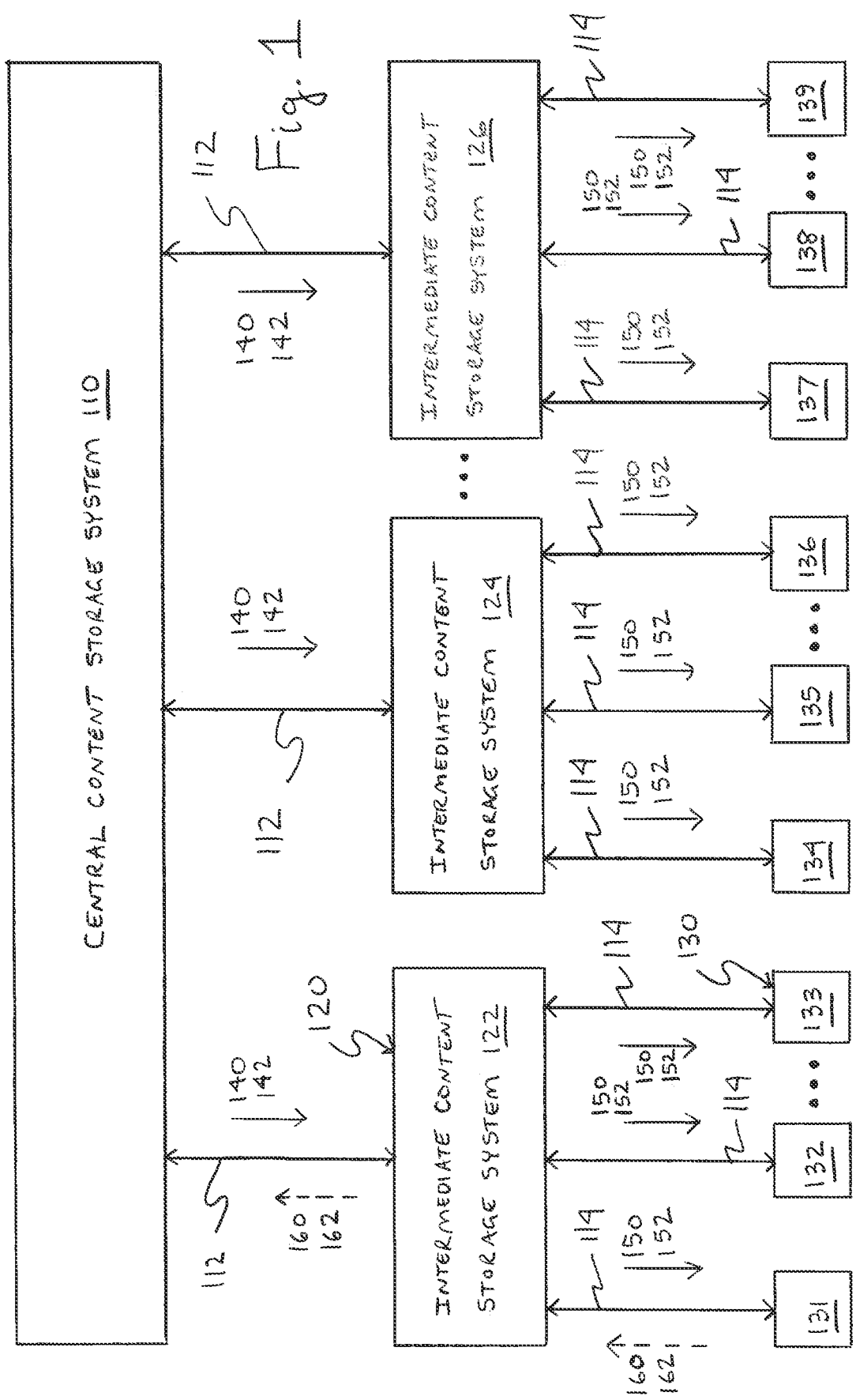
FIG. 1 is a top-level block diagram illustrating an exemplary embodiment of a content distribution network system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available traditional solutions serve rural space poorly, a system and method that can provide content distribution network egress and/or ingress functionality for over ninety percent of consumers in the United States can prove desirable and provide a basis for a wide range of computer applications, including autonomous, artificial intelligence (AI) and Internet of Things (IoT) applications. This result can be achieved, according to one embodiment disclosed herein, by a content distribution (or delivery) network (CDN) system 100 as illustrated in FIG. 1.

The content distribution network system 100 can comprise a highly-distributed, redundantly-connected network of storage and compute nodes, such as one or more central content storage systems 110, a plurality of intermediate content storage systems 120 and/or a plurality of local content storage system 130. Metadata preferably is distributed to all nodes. The content distribution network system 100 advantageously can use a data acceleration protocol to move data efficiently and quickly to any node in the content distribution network system 100 based upon, for example, data access patterns ensuring frequently accessed data is available with extremely low latency.

An exemplary data acceleration protocol can comprise RWave data acceleration protocol for accelerating the movement of data between two distant locations and is available from R-Stor Inc., located in Saratoga, Calif. The data acceleration protocol advantageously can present as a Transmission Control Protocol (TCP) but, behind the covers, can parallelize the process of packaging and moving the data content to maximize the efficiency of the pipe (97%) while minimizing the impact of latency accumulation. In selected embodiments, data can be 'streamed' minimizing time to first byte.

In selected embodiments, the content distribution network system 100 can be provided as a redundant mesh network with distributed points of presence (PoPs), such as the central content storage systems 110, the intermediate content storage systems 120 and/or the local content storage system 130. An exemplary redundant mesh network is available from R-Stor Inc., located in Saratoga, Calif. The redundant mesh network advantageously can avoid a single point of failure by using private fabric for connecting each of the distributed points of presence. The data acceleration protocol thereby can be leveraged to move content seamlessly and quickly through the mesh network. Stated somewhat differently, the data acceleration protocol can enable data to be moved with high bandwidth efficiency while minimizing the impact of latency.

Advantageously, data can be accessed at any point of presence in the mesh network, and/or data can be ingested at any point of presence in the mesh network. The content distribution network system 100 thereby can minimize an impact of latency, ensuring that all data appears in local proximity to the application. Additionally and/or alternative, the data can be automatically protected by local erasure coding and remote replication. If utilized for Internet of Things (IoT) applications, for example, the data can be ingested locally and processed, such as via a selected local content storage system 130, and content distribution network system 100 can make the aggregated data sets available for further analysis in combination with other result sets. This can reduce the volume of network traffic significantly especially for very small object transfers.

Turning to FIG. 1, the content distribution network system 100 is shown as including at least one central content storage system 110. Each central content storage system 110 can comprise any conventional type of network component, such as a server, computer, workstation, data storage system, without limitation, and can store and/or maintain original data content 140. An exemplary central content storage system 110 can include a core storage system available from R-Stor Inc., of Saratoga, Calif.

The points of presence can provide a data storage capability. In selected embodiments, each point of presence can provide a respective data storage capacity, which can be uniform and/or different among the points of presence. The content distribution network system 100 advantageously can support deterministic data placement and data fluidity. For example, the content distribution network system 100 can enable a customer or other user (not shown) to deterministically place user data, such as by choosing a location where the user data will be stored. Additionally and/or alternatively, the user data can be placed based on access patterns. The access patterns can permit the user data to fluidly move around the content distribution network system 100 to help ensure that the user data appears 'local' to the application accessing the user data. The content distribution network system 100 thereby can intelligently move the data around the network, for instance, based upon access.

The original data content 140 preferably can be stored with associated metadata 142 for describing the stored original data content 140. The metadata 142, for example, can include a set of one or more attributes describing an object. Exemplary attributes can comprise a name, a size, a data type, a location, a creation date and/or a last access date, without limitation. The last access date, for example, can be used to 'age out' the data from one or more temporary locations.

In selected embodiments, one or more of the central content storage systems 110 can resiliently store the original data content 140 and/or the associated metadata 142 locally using selected erasure coding and/or replication protocols. For example, one or more, and preferably all, of the points of presence storage can support erasure coding to ensure persisted data is protected should there be any data storage device failure of a storage media device, such as a mechanical device failure of a hard disk drive (HDD), associated with a selected point of presence, wherein the data stored at the failed data storage device become unreadable.

The data, for example, can be distributed using an 8+3 tolerance supporting a rebuild of any failed data set should up to three storage media devices fail at the same time. The erasure code algorithm advantageously can help ensure that the data is distributed across the storage media device devices and other subsystems associated with a plurality of the points of presence storage for providing a high level of resilience.

Additionally and/or alternatively, a selected customer or other user can choose to replicate data so that, even if there is a local failure of a first data storage device associated with a first point of presence, the data can be recovered remotely, such as via a second data storage device associated with a second (or different) point of presence that is located at a geographic location that is remote from a geographic location of the first point of presence. In selected embodiments, the replicated data also can be erasure coded. Although shown and described as including a single central content storage system 110 with reference to FIG. 1 for purposes of illustration only, the content distribution network system 100 can include any suitable predetermined number of central content storage systems 110, without limitation.

The content distribution network system 100 is shown as including a plurality of intermediate content storage systems 120. Each of the intermediate content storage systems 120 can be associated with, and configured to communication with, the central content storage system 110 and/or can store original data content 140 recently accessed by users and/or the associated metadata 142 for the data content 140 recently accessed by users. Stated somewhat differently, if the content distribution network system 100 includes more than one central content storage system 110, each central content storage system 110 can be associated with, and configured to communication with, a group of at least one intermediate content storage system 120.

Figure 5:
FIG. 5 is a detail diagram illustrating another exemplary alternative embodiment of the content distribution network system of FIG. 1, wherein redundantly-connected points of presences of the content distribution network system are distributed across a plurality of major metropolitan locations.

Turning to briefly FIG. 5, the content distribution network system 100 is shown as comprising a plurality of points of presence (PoPs), such as the central content storage systems 110, the intermediate content storage systems 120 and/or the local content storage system 130, as being distributed across the continental United States. The points of presence, for example, can be located in proximity to respective major metropolitan areas in the United States. For purposes of illustration only, the points of presence in FIG. 5 are shown as being enclosed in circles with predetermined diameters. The diameters can be uniform and/or different among the points of presence and, for example, can represents a three millisecond (3 ms) range from a center of the respective circle in selected embodiments. By locating the points of presence in proximity to respective major metropolitan areas, the content distribution network system 100 advantageously can provide three millisecond (3 ms) access to the majority, if not all, of the enterprises within the United States.

In the manner discussed in more detail above with reference to the content distribution network system 100 of FIG. 1, points of presence can be redundantly connected via the private fabric and/or the data acceleration protocol. Additionally and/or alternatively, the data access patterns can be used to move data to any preselected point of presence for minimizing the impact of latency and/or for helping to ensure that the user data appears 'local' to the application accessing the user data. In selected embodiments, data can naturally 'age out' when not accessed for a predetermined period of time.

Returning to FIG. 1, the central content storage system 110, for example, is illustrated as being associated with, and configured to communication with, intermediate content storage systems 122, 124, 126. Although shown and described as including three central content storage systems 110 with reference to FIG. 1 for purposes of illustration only, the content distribution network system 100 can include any suitable predetermined number of central content storage systems 110 each being in communication with one or more relevant central content storage systems 110, without limitation.

Each of the intermediate content storage systems 120 likewise can be associated with, and configured to communication with, at least one local content storage system 130 for supporting user access to the data content 140 most frequently accessed by users. In other words, each intermediate content storage system 120 can be associated with, and configured to communication with, a group of one or more local content storage systems 130. In selected embodiments, each central content storage system 110 can be associated with up to three hundred intermediate content storage systems 120 and/or five thousand local content storage systems 130, or more, without limitation. The intermediate content storage system 122 of FIG. 1, for example, can be associated with, and configured to communication with, local content storage systems 131-133. Similarly, intermediate content storage system 124 can be associated with, and configured to communication with, local content storage systems 134-136; whereas, intermediate content storage system 126 can be associated with, and configured to communication with, local content storage systems 137-139.

Although shown and described as having each intermediate content storage system 120 being configured to communicate with three local content storage systems 130 with reference to FIG. 1 for purposes of illustration only, the content distribution network system 100 can include any suitable predetermined number of local content storage systems 130 each being in communication with one or more relevant intermediate content storage systems 120, without limitation.

In selected embodiments, for example, the metadata can be distributed so that each intermediate content storage system 120 and/or local content storage system 130 can have visibility to stored data content and location information about where the data content is located. Users and other customers advantageously can choose one or more geographic locations where data will be placed. In selected embodiments, the content distribution network system 100 can place the data dependent on access patterns. The private fabric and/or the data acceleration protocol can be used to efficiently and quickly move the data on an "as needed" basis in the manner discussed in more detail herein.

Figure 2:
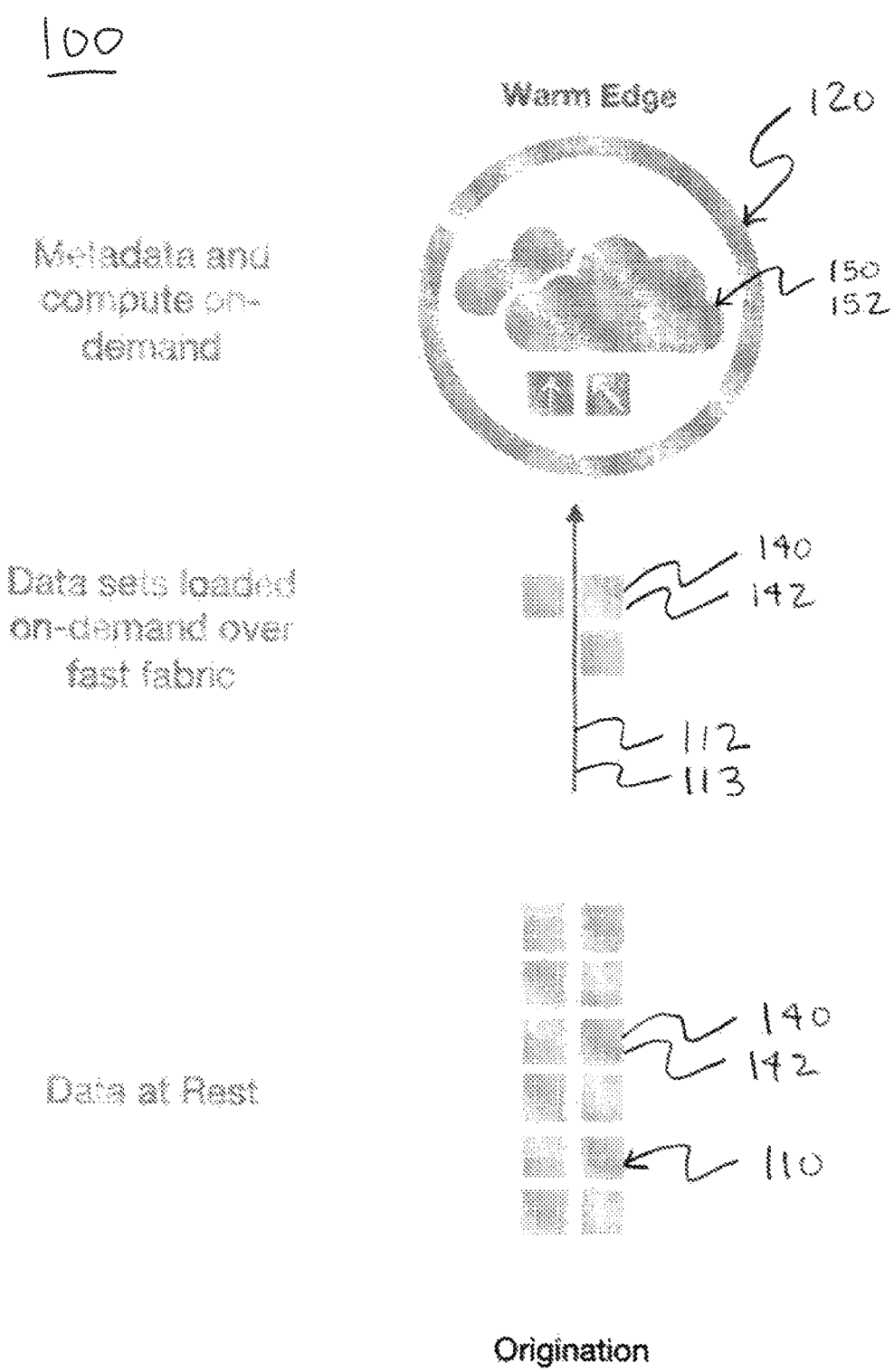
FIG. 2 is a detail diagram illustrating an exemplary alternative embodiment of the content distribution network system of FIG. 1, wherein at least one fast fabric communication connection couples a central content storage system with a selected intermediate content storage system for providing on demand loading of data content.

FIG. 2 illustrates an alternative embodiment of the content distribution network system 100 with at least one fast fabric communication connection. Turning to FIG. 2, the original data content 140 and/or the associated metadata 142 is shown as being loaded, on demand, from the central content storage system 110 to a selected intermediate content storage system 120 via a communication connection 112 that comprises a fast fabric communication connection. The fast fabric communication connection is shown in FIG. 2 as including a fiber communication ring 113. The selected intermediate content storage system 120 can load the original data content 140 and/or the associated metadata 142 for storage as local data content 150 and/or the associated metadata 152 for the local data content 150.

Returning to FIG. 1, the central content storage system(s) 110, the intermediate content storage systems 120 and local content storage systems 130 can be arranged in any suitable network topology. In selected embodiments, the content distribution network system 100 can provided one or more levels of redundancy.

One or more of the local content storage systems 130 advantageously can be disposed at a geographic location that is proximate to a selected geographic region, such as a county, state or country, for helping to ensure that the content distribution network system 100 can provide the local data content 150 and/or the associated metadata 152 from the local content storage systems 130 to a predetermined percentage, such as between 75% and 95%, of a local user population of the selected geographic region within a predetermined transmission latency period, such as between one and fifty milliseconds.

Stated somewhat differently, the local user population of the selected geographic region can access the local data content 150 and/or the associated metadata 152 via a plurality of the local content storage systems 130 that support data operations for the selected geographic region. In selected embodiments, at least one of the local content storage systems 130 can be configured to communicate with more than one of the intermediate content storage systems 120 to provided added data redundancy.

Additionally and/or alternatively, the content distribution network system 100 can help ensure a high level of redundancy and/or to help protect against any single point of network failure. In selected embodiments, the content distribution network system 100 can be provided as a redundant mesh network with distributed points of presence (PoPs), such as the central content storage systems 110, the intermediate content storage systems 120 and/or the local content storage system 130 in the manner set forth above. Stated somewhat differently, each point of presence can be redundantly connected with one or more other points of presence to form a mesh. One or more vendors, for example, can provide the network fabric to help ensure that no dependency on a single route exists between selected points of presence—no single point of failure. Additionally and/or alternatively, all hardware components can be multi-homed ensuring any local hardware failure will not impact customer or user accessibility, even to the level of an entire data center going offline. In selected embodiments, the software stack can be architected to provide real-time failover in the event of any system level failure.

Although shown as being coupled via a single communication connection 112 in FIG. 1, for example, one or more of the intermediate content storage systems 120 can support communication with the relevant central content storage system 110 via a respective plurality of communication connections 112 to help ensure a high level of redundancy and/or to help protect against any single point of network failure. Additionally and/or alternatively, one or more of the local content storage systems 130 can support communication with the relevant intermediate content storage system 120 via a respective plurality of communication connections 114 to likewise help ensure a high level of redundancy and/or to help protect against any single point of network failure.

In other words, the content distribution network system 100 can provide the original data content 140 and/or the associated metadata 142 from the central content storage system(s) 110 to a preselected local content storage system 130 as the local data content 150 and/or the associated metadata 152 via any of a plurality of communication connections 112 between the central content storage system(s) 110 and at least one selected intermediate content storage system 120 and/or via any of a plurality of communication connections 114 between the at least one selected intermediate content storage system 120 and the preselected local content storage system 130. In selected embodiments of the content distribution network system 100, a plurality of intermediate content storage systems 120 can provide the local data content 150 and/or the associated metadata 152 to a predetermined group of local content storage systems 130.

The content distribution network system 100 preferably moves data content 140, 150 and/or the associated metadata 142, 152 among the central content storage system(s) 110, the intermediate content storage systems 120 and/or local content storage systems 130 only moved as required and thereby minimizes network traffic within the content distribution network system 100. For example, centralized operations of the content distribution network system 100 can initiate remote processing of one or more data sets with the processing results, preferably without the entire data set, being moved across the network. This can dramatically reduce the impact of data movement through the network.

An exemplary remote process may ultimately result in only a fraction of the entire data set being transited on the network. Additionally and/or alternatively, the movement of data content 140, 150 and/or the associated metadata 142, 152 does not require that all processing be centralized with the distributed compute providing additional resource; instead, at least some of the data movement can be performed via non-centralized operations and/or non-centralized processing.

In selected embodiments, the content distribution network system 100 can leverage a file acceleration protocol for moving the data content 140, 150 and/or the associated metadata 142, 152 seamlessly and quickly among the central content storage system(s) 110, the intermediate content storage systems 120 and/or local content storage systems 130. Additionally and/or alternatively, a Domain Name System (DNS) service can be utilized to determine a nearest location to access selected data based upon a location where a request for the selected data originates. The DNS service can initiate a metadata search which will point to where the data content is stored. If necessary, the data will be routed closer based on frequency of access.

The central content storage system 110, in operation, can provide the original data content 140 and/or the associated metadata 142 to one or more of the associated intermediate content storage systems 120. In selected embodiments, metadata can be highly replicated throughout the network of points of presence of the content distribution network system 100. When an application submits a request to access data (either read or write), for example, the metadata can contain a pointer to a location where the requested data is stored in the distributed storage layer and/or can access the requested data at that location efficiently.

If the same data (object level) is frequently accessed, a temporary copy of the data can be moved in location to enhance the performance of accessing the frequently-accessed data making the frequently-accessed data appear 'local' to the application. In selected embodiments, the temporary copy can naturally age out when the frequently-accessed data is no longer being accessed. Replication advantageously can help to ensure that all data is always current and synchronized.

In selected embodiments, the central content storage system 110 can stream the original data content 140 and/or the associated metadata 142 to one or more of the associated intermediate content storage systems 120. The original data content 140 and/or the associated metadata 142 thereby can be replicated at the associated intermediate content storage systems 120.

Advantageously, the content distribution network system 100 can be responsible for helping to ensure that data content 140 that is recently and/or frequently accessed by users is maintained and readily available at the intermediate content storage systems 120 and/or the local content storage systems 130. In selected embodiments, one or more system level and/or customer definable policies can support the policy rules used to determine when data is to be stored at an intermediate location. Exemplary policy rules can include a last accessed date (for aging purposes), a number of times requested at this location, a data size and/or a nearest location, etc., without limitation Additionally and/or alternatively, implemented system level heuristics can attempt to minimize network traffic while ensuring near real-time access to data is achieved.

In other words, each intermediate content storage system 120 can receive the original data content 140 and/or the associated metadata 142 from the relevant central content storage system 110 and store and/or maintain the original data content 140 and/or the associated metadata 142 as on-demand local data content 150 and/or associated metadata 152. In selected embodiments, the local content storage systems 130 can maintain and make readily available data content 140 that is most frequently accessed by users.

The content distribution network system 100, in operation, advantageously can support a data egress function, wherein the local content storage systems 130 can provide the on-demand local data content 150 and/or associated metadata 152 to one or more users within the local user population of the selected geographic region. Stated somewhat differently, the local content storage systems 130 can be configured as edge points of presence (PoPs) that can be used as data egress points. The intermediate content storage system 120, for example, can provide the on-demand local data content 150 and/or associated metadata 152 to one or more of the associated local content storage systems 130. The local content storage systems 130 thereby can support the most-frequently accessed on-demand local data content 150 and/or associated metadata 152. In selected embodiments, the central content storage system 110 can stream the original data content 140 and/or the associated metadata 142 to one or more of the associated intermediate content storage systems 120.

Figure 3:
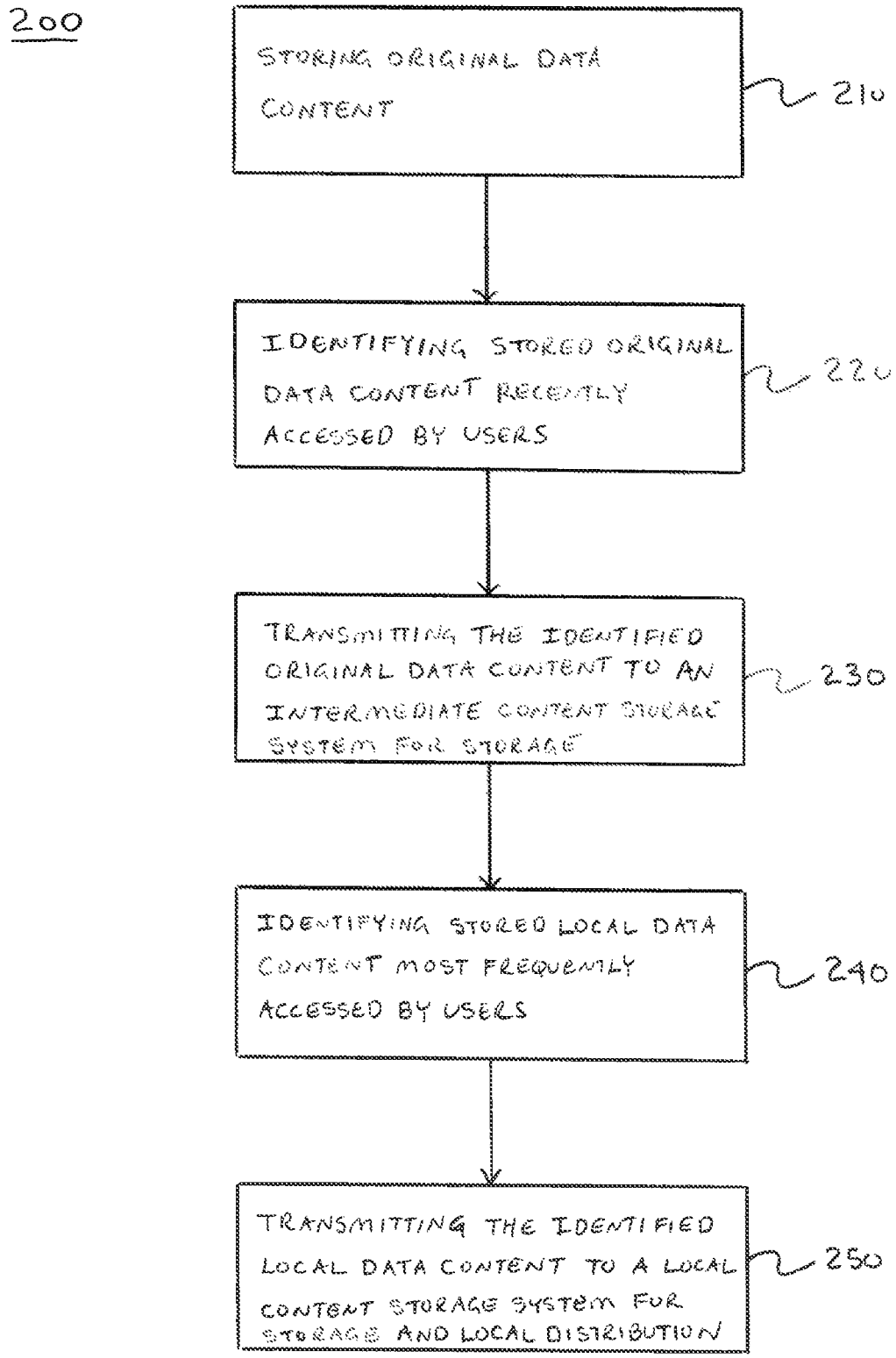
FIG. 3 is a top-level flow chart illustrating an exemplary embodiment of a data egress method for the content distribution network system of FIG. 1.

An exemplary data egress method 200 for the content distribution network system 100 is shown in FIG. 3. Turning to FIG. 3, original data content 140 can be stored, at 210. The original data content 140 optionally can be stored, at 210, with associated metadata 142 for describing the stored original data content 140. At 220, the stored data content 140 that has been recently accessed by users can be identified. The identified data content 140 can be transmitted to one or more intermediate content storage systems 120, at 230. The intermediate content storage systems 120 can store the identified data content 140 as the local data content 150. The local data content 150 optionally can be stored with associated metadata 152 for describing the local data content 150.

At 240, identified local data content 150 that is most frequently accessed by users can be identified. The identified local data content 150 can be transmitted to one or more local content storage systems 130, at 250. The local content storage systems 130 can store the identified local data content 150. The identified local data content 150 optionally can be stored with associated metadata 152 for describing the identified local data content 150. In the manner set forth above, the local content storage systems 130 advantageously can be disposed at a geographic location that is proximate to a selected geographic region and/or can provide the identified local data content 150 and/or the associated metadata 152 to the local user population of the selected geographic region in a seamless and rapid manner.

In selected embodiments, the content distribution network system 100 can support an optional data ingress function. An exemplary data ingress method 300 for the content distribution network system 100 is shown in FIG. 4. Turning to FIG. 4 in conjunction with FIG. 1, the data ingress method 300, at 310, can enable at least one local content storage system 130 to receive user data content 160 submitted by users (not shown). In other words, if the local content storage system 130 is disposed at a geographic location that is proximate to a selected geographic region in the manner discussed in more detail above, the local user population of the selected geographic region can submit user data content 160 to the local content storage system 130.

The user data content 160 preferably is submitted to the local content storage system 130 with associated metadata 162 for describing the user data content 160. In selected embodiments, the user data content 160 as received by the local content storage system 130 can be encrypted and/or compressed. Any encryption keys for the user data content 160 can be managed by the user. Stated somewhat differently, the content distribution network system 100 preferably lacks access to the data within the user data content 160, ensuring a high level of protection and/or security for the user data content 160. The local content storage system 130 can store the user data content 160 and/or the associated metadata 162.

In selected embodiments, the local content storage system 130 optionally can locally process the user data content 160 and/or the associated metadata 162, at 320. The local content storage system 130, for example, can filter the user data content 160 and/or the associated metadata 162. Advantageously, the local content storage system 130 can process the user data content 160 and/or the associated metadata 162 in location. The local content storage system 130 likewise can transmit the user data content 160 and/or the associated metadata 162 to one or more intermediate content storage system 120, at 330.

The intermediate content storage system 120 can receive and store the transmitted user data content 160 and/or the associated metadata 162 from the local content storage system 130. In selected embodiments, the intermediate content storage system 120 optionally can locally process the user data content 160 and/or the associated metadata 162, at 340. The intermediate content storage system 120, for example, can filter the user data content 160 and/or the associated metadata 162. Advantageously, the intermediate content storage system 120 can process the user data content 160 and/or the associated metadata 162 in location.

The intermediate content storage system 120 can transmit the user data content 160 and/or the associated metadata 162 to the central content storage system 110. The central content storage system 110 can receive and store the transmitted user data content 160 and/or the associated metadata 162 from the intermediate content storage system 120. In selected embodiments, the central content storage system 110 optionally can locally process the user data content 160 and/or the associated metadata 162.

The central content storage system 110, for example, can filter the user data content 160 and/or the associated metadata 162. Advantageously, the central content storage system 110 can process the user data content 160 and/or the associated metadata 162 in location. By storing the user data content 160 and/or the associated metadata 162, at the central content storage system(s) 110, the intermediate content storage systems 120 and/or local content storage systems 130, the content distribution network system 100 advantageously can help to ensure a high level of resilience for the user data content 160 and/or the associated metadata 162.

Although various implementations are discussed herein and shown in the figures, it will be understood that the principles described herein are not limited to such. For example, while particular scenarios are referenced, it will be understood that the principles described herein apply to any suitable type of computer network or other type of computing platform, including, but not limited to, a Local Area Network (LAN), a Wide Area Network (WAN), a Wireless Local Area Network (WLAN), a Metropolitan Area Network (MAN) and/or a Campus Area Network (CAN). As used herein, a phrase in the form of at least one of A, B, C and D herein is to be construed as meaning one or more of A, one or more of B, one or more of C and/or one or more of D.

Accordingly, persons of ordinary skill in the art will understand that, although particular embodiments have been illustrated and described, the principles described herein can be applied to different types of computing platforms. Certain embodiments have been described for the purpose of simplifying the description, and it will be understood to persons skilled in the art that this is illustrative only. It will also be understood that reference to a "server," "computer," "network component" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

What is claimed is:

1. A method for egressing data content in a content distribution network system, comprising:
   identifying stored original data content as being recently accessed;
   transmitting the identified data content to an intermediate storage system;
   storing the identified data content at the intermediate storage system;
   identifying stored identified data content at the intermediate storage system as being frequently accessed;
   transmitting the identified frequently-accessed data content from the intermediate storage system to a local storage system being disposed at a selected geographic region; and
   storing the identified frequently-accessed data content at the local storage system, wherein the local storage system makes the stored frequently-accessed data content available to a local user population within the selected geographic region, wherein the local storage system ensures that the stored frequently-accessed data content is available to a predetermined percentage of the local user population within the selected geographic region within a predetermined transmission latency period, wherein the predetermined percentage is between 75% and 95%, and wherein the predetermined transmission latency period is between one and fifty milliseconds, or a combination thereof.

2. The method of claim 1, wherein said identifying the stored original data content comprises identifying the stored original data content as being recently accessed by one or more users within the local user population.

3. The method of claim 1, wherein said transmitting the identified data content includes transmitting the identified data content and metadata associated with the identified data content to the intermediate storage system, wherein said storing the identified data content includes storing the identified data content and the associated metadata at the intermediate storage system, wherein said transmitting the identified frequently-accessed data content includes transmitting the identified frequently-accessed data content and the associated metadata from the intermediate storage system to the local storage system and wherein said storing the identified frequently-accessed data content includes storing the identified frequently-accessed data content and the associated metadata at the local storage system.

4. The method of claim 3, wherein said transmitting the identified data content comprises transmitting the identified data content to the intermediate storage system based upon the metadata associated with the identified data content.

5. The method of claim 3, wherein said transmitting the identified frequently-accessed data content comprises transmitting the identified frequently-accessed data content to the local storage system based upon the metadata associated with the identified data content.

6. The method of claim 1, wherein said transmitting the identified data content includes transmitting the identified data content to a plurality of intermediate storage systems including a selected intermediate storage system, and wherein said transmitting the identified frequently-accessed data content comprises transmitting the identified frequently-accessed data content from the selected intermediate storage system to the local storage system.

7. The method of claim 1, further comprising receiving user data content submitted by one or more users within the local user population.

8. The method of claim 7, further comprising processing the user data content at the local storage system.

9. The method of claim 7, further comprising transmitting the received user data content to a selected intermediate content storage system.

10. The method of claim 9, further comprising processing the received user data content at the selected intermediate content storage system.

11. The method of claim 9, further comprising transmitting the received user data content from the selected intermediate content storage system to a central content storage system.

12. A computer program product for egressing data content in a content distribution network system, the computer program product being encoded on one or more non-transitory machine-readable storage media and comprising:
   instruction for identifying stored original data content as being recently accessed;
   instruction for transmitting the identified data content to an intermediate storage system;
   instruction for storing the identified data content at the intermediate storage system;
   instruction for identifying stored identified data content at the intermediate storage system as being frequently accessed;
   instruction for transmitting the identified frequently-accessed data content from the intermediate storage system to a local storage system being disposed at a selected geographic region; and
   instruction for storing the identified frequently-accessed data content at the local storage system, wherein the local storage system makes the stored frequently-accessed data content available on demand to a local user population within the selected geographic region, wherein the local storage system ensures that the stored frequently-accessed data content is available to a predetermined percentage of the local user population within the selected geographic region within a predetermined transmission latency period, wherein the predetermined percentage is between 75% and 95%, and wherein the predetermined transmission latency period is between one and fifty milliseconds, or a combination thereof.

13. A content distribution network system, comprising:
   a central content storage system for storing original data content and identifying selected stored original data content as being recently accessed data content;
   a plurality of intermediate content storage systems each being in communication with said central content storage system, at least one selected intermediate content storage system being configured for receiving the selected stored original data content from said central content storage system, storing the received data content and identifying the selected received data content as being frequently accessed; and
   a plurality of local content storage systems each being in communication with said selected intermediate content storage system, at least one of said local content storage systems being configured for receiving the selected data content identified as being frequently accessed by said selected intermediate content storage system, storing the received frequently-accessed data content and making the stored frequently-accessed data content available to a local user population within the selected geographic region, wherein the local storage system ensures that the stored frequently-accessed data content is available to a predetermined percentage of the local user population within the selected geographic region within a predetermined transmission latency period, wherein the predetermined percentage is between 75% and 95%, and wherein the predetermined transmission latency period is between one and fifty milliseconds, or a combination thereof.

14. The system of claim 13, wherein a selected intermediate content storage system is coupled with said central content storage system via a plurality of communication connections.

15. The system of claim 13, wherein a selected local content storage system is coupled with a selected intermediate content storage system via a plurality of communication connections.

16. The system of claim 13, wherein two or more of said intermediate content storage systems and said local content storage systems are disposed upon a fiber communication ring to help maximize data redundancy and protect against any single point of failure within the content distribution network system.

\* \* \* \* \*